US012700666B2

(12) United States Patent
Biurrun Quel et al.

(10) Patent No.: US 12,700,666 B2
(45) Date of Patent: Aug. 4, 2026

(54) MICROWAVE DISTRIBUTION NETWORK

(71) Applicant: AIRBUS DEFENCE AND SPACE S.A., Madrid (ES)

(72) Inventors: Carlos Biurrun Quel, Pamplona (ES); Carlos Del Río Bocio, Pamplona (ES); Antonio Montesano Benito, Madrid (ES)

(73) Assignee: AIRBUS DEFENCE AND SPACE S.A., Madrid (ES)

( * ) Notice: Subject to any disclaimer, the term of this patent is extended or adjusted under 35 U.S.C. 154(b) by 600 days.

(21) Appl. No.: 17/793,627

(22) PCT Filed: Jan. 25, 2021

(86) PCT No.: PCT/ES2021/070053

§ 371 (c)(1),
(2) Date: Jul. 18, 2022

(87) PCT Pub. No.: WO2021/148708

PCT Pub. Date: Jul. 29, 2021

(65) Prior Publication Data

US 2023/0069635 A1 Mar. 2, 2023

(30) Foreign Application Priority Data

Jan. 24, 2020 (EP) .................................... 20382045

(51) Int. Cl.
*H01Q 1/52* (2006.01)
*H01Q 21/00* (2006.01)
*H01Q 25/00* (2006.01)

(52) U.S. Cl.
CPC ......... *H01Q 1/526* (2013.01); *H01Q 21/0006* (2013.01); *H01Q 25/008* (2013.01)

(58) Field of Classification Search
None
See application file for complete search history.

(56) References Cited

U.S. PATENT DOCUMENTS

| | | | | |
|---|---|---|---|---|
| 9,374,145 | B2 * | 6/2016 | Angeletti | H01Q 3/40 |
| 10,270,524 | B2 * | 4/2019 | Burr | H01Q 3/267 |
| 2011/0102263 | A1 * | 5/2011 | Angeletti | H01Q 3/40 342/373 |

FOREIGN PATENT DOCUMENTS

| | | | | |
|---|---|---|---|---|
| CN | 208655886 U | * 3/2019 | | |
| GB | 2140974 A | * 12/1984 | | H01Q 21/065 |

OTHER PUBLICATIONS

Arce et al., "A New Multiple-Beam Forming Network Design Approach For A Planar Antenna Array Using CORPS", Journal of Electromagnetic Waves and Applications, 2012, vol. 26., pp. 294-306.

(Continued)

*Primary Examiner* — Dameon E Levi
*Assistant Examiner* — Anh Ho
(74) *Attorney, Agent, or Firm* — Merchant & Gould P.C.

(57) ABSTRACT

A microwave distribution network includes stacks of layers, each layer including unit cells. The unit cells have a coaxial input connected to three transmission lines with an angular span of 120°. The layers are configured as a hexagonal lattice formed with replicated unit cells. The coaxial inputs are at the hexagon corners. Each unit cell is connected to three neighbor unit cells. The coaxial inputs of the unit cells and neighbor cells are oriented on a Z-axis of a Cartesian system of axes in which the three transmission lines are on an XY plane, such that the input orientation on the Z-axis is opposite to the former unit cell on the same Z-axis. The distance between coaxial inputs is $\lambda/4$, where $\lambda$ is the wavelength of a microwave distribution network operating frequency. Adjacent layers are interconnected by the coaxial inputs of the unit cells arranged in an opposite direction.

7 Claims, 13 Drawing Sheets

(56) References Cited

OTHER PUBLICATIONS

Ferrando et al., "Investigations on the Efficiency of Array Fed Coherently Radiating Periodic Structure Beam Forming Networks", IEEE Transactions on Antennas and Propagation, 2010, 59(2): 493-502.
Garcia et al., "Coherently radiating periodic structures (CORPS): a step towards high resolution imaging systems?," 2005 IEEE Antennas and Propagation Society International Symposium, 2005, vol. 4B, pp. 347-350.
Betancourt et al., "Multi-Beam Applications of CORPS BFN: Reflector Antenna Feeding System," Proc. 30th ESA Workshop on Antennas for Earth Observation, Science, Telecommunication and Navigation Space Missions, Noordwijk, The Netherlands, 2008, pp. 287-289, 27-30.
Betancourt et al, "A Novel Methodology to Feed Phased Array Antennas," in IEEE Transactions on Antennas and Propagation, 2007, vol. 55, No. 9, pp. 2489-2494.
Betancourt et al, "A Beamforming Network For Multibeam Antenna Arrays Based On Coherent Radiating Periodic Structures," The Second European Conference on Antennas and Propagation, EuCAP 2007, 2007, pp. 1-4.
International Search Report and Written Opinion for PCT/ES2021/070053 (Jul. 9, 2021).

* cited by examiner

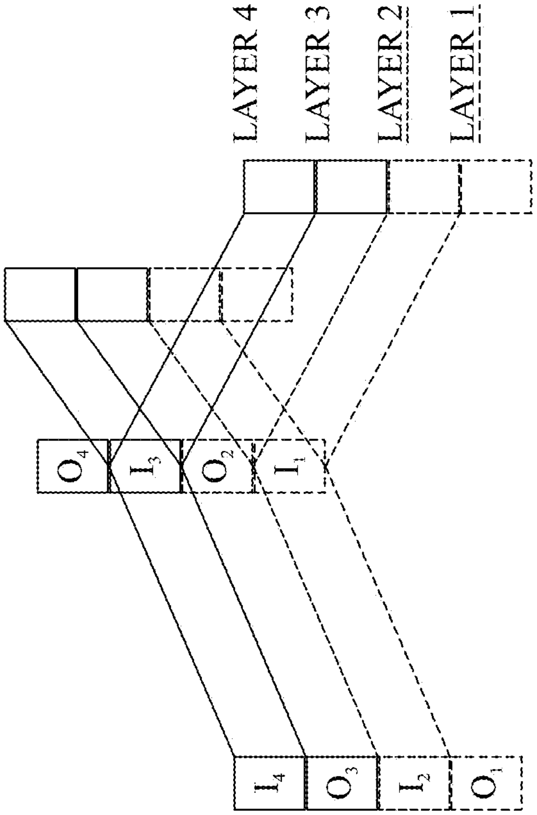
DETAIL OF FIG. 5
FIG. 5A
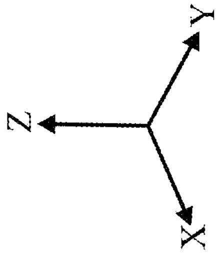

MICROWAVE DISTRIBUTION NETWORK

This application is a National Stage Application of PCT/ES2021/070053, filed Jan. 25, 2021, which claims benefit of European Patent Application No. 20382045.1, filed Jan. 24, 2020, and which applications are incorporated herein by reference. To the extent appropriate, a claim of priority is made to each of the above disclosed applications.

FIELD OF THE INVENTION

The present invention relates to a microwave distribution network, mainly used in space systems and in satellite applications, or in terrestrial or ground segment applications, either used as part of a reflector or lens system, or a direct radiating array. It also relates to an antenna array, a reflector antenna or a lens antenna comprising such microwave distribution network.

BACKGROUND OF THE INVENTION

An antenna array consists of a set of multiple simple antennas working together as a single compound antenna.

There are multibeam antennas, which are capable to generate simultaneous multiple independent beams from a common antenna aperture. In multibeam applications, one of the most frequent limitations is the maximum resolution capability of the system, which is limited by the size and dimensions of the radiating elements as well as by the distance between phase centres of adjacent beams. A useful approach is to implement the effective radiating areas with an array of small antennas, opening the possibility to overlap and reduce the distance between neighbouring beams. This is especially interesting for applications with reflector systems (see, for example, the document "Multi-beam applications of CORPS BFN: Reflector antenna feeding system"; D. Betancourt, C. Del Río Bocio).

"A novel methodology to feed phased array antennas" (D. Betancourt, C. Del Río Bocio): in this document a new methodology to design beam-forming networks (BFN) to feed antenna arrays is introduced. Using this methodology is feasible to reduce the complexity of the associate control of a phased array, since, an N by N antenna array could be controlled to steer the beam using four phase shifters instead of the $N^2$ conventionally used. A prototype was designed, built and measured as proof of concept. The prototype consists on 3 by 3 Quasi-Yagi antennas fed by four input-ports. The measurements show that the main beam of an antenna array fed by this BFN can be steered to any desired direction.

"A beamforming network for multibeam antenna arrays based on coherent radiating periodic structures" (D. Betancourt, C. Del Río) describes a practical application for a CORPS-BFN in the field of multibeam systems. It presents an analytical study and a prototype consisting of 3 input ports, 3 layers and 6 output ports. The BEN is a structure that can smartly spread different signals within it, in a way that a signal introduced to every input port is driven throughout the structure to a particular set of output ports, the closer ones to the input port.

"Investigations on the efficiency of array fed coherently radiating periodic structure beam forming networks" (Ferrando N., Fonseca N. J. G.) investigates the capacity and efficiency of C-BFN systems. Introducing a simple matrix formulation, it details the losses due to the non-orthogonal nature of the BFN for mono and multibeam as well as the beam steering capability. The results of the study indicate that CORPS-BFN has a reasonable limitation of 3 to 4 layers in mono-beam configuration but of 8 to 10 in multibeam. It also shows how periodic arrangement structures have also applications in circular or cylindrical designs.

"A new multiple-beam forming network design approach for a planar antenna array using CORPS" (Arce A., Covarrubias D. H., Panduro M. A., Garza L. A.) deals with a way to design and analyze beam-forming networks (BFN) for a mutibeam steerable planar antenna array using Coherently Radiating Periodic Structures (CORPS) technology. It proposes a configuration that alternates input ports in subgroups, where the input ports are reused by more than one signal or beam. The complete multibeam system is designed to generate 9 orthogonal beams simultaneously.

Another prior art document is "Coherently radiating periodic structures (CORPS): a step towards high resolution imaging systems" (R. García, D. Betancourt, A. Ibáñez, C. del Rio).

Currently the state of the art provides several proposals for distribution networks or structures, some of them based on Coherently Radiating Periodic Structures—Beam Forming Network (CORPS-BFN) technology.

However, there is a need to reduce even more the distance between neighbouring beams in distribution networks.

SUMMARY OF THE INVENTION

Thus, it is an object of the invention to provide a microwave distribution network that allows a reduction in the distance between neighbouring beams.

The invention provides a microwave distribution network comprising a stacking of several layers, each of the layers comprising a plurality of unit cells, wherein:

- the unit cells comprise a coaxial input connected to three transmission lines with an angular span of 120°, the coaxial input being orientated on an Z-axis of a Cartesian system of axes in which the three transmission lines are on an XY plane,
- the layers are configured as a hexagonal lattice formed with the unit cells by periodical replication, with the coaxial inputs placed at the corners of the hexagons, such that each unit cell is connected to three neighbour unit cells, the coaxial inputs of the three neighbour unit cells being oriented on an Z-axis of a Cartesian system of axes in which the three transmission lines are on an XY plane, such that this orientation on the Z-axis is opposite to the orientation of the coaxial input of the former unit cell on the same Z-axis,
- the distance between coaxial inputs is set to λ/4, wherein λ is the wavelength of an operating frequency of the microwave distribution network, and
- the adjacent layers are interconnected by means of the coaxial inputs of the unit cells that are arranged in opposite directions.

The invention also provides a microwave distribution network, comprising a stacking of several layers, each of the layers comprising a plurality of unit cells, wherein:

- the unit cells comprise a coaxial input connected to four transmission lines with an angular span of 90°, the coaxial input being orientated on an Z-axis of a Cartesian system of axes in which the four transmission lines are on an XY plane,
- the layers are configured as a square or rectangular lattice formed with the unit cells by periodical replication, with the coaxial inputs placed at the corners of the square or rectangle, such that each unit cell is connected to four neighbour unit cells, the coaxial inputs of the four neighbour unit cells being oriented on an Z-axis of a Cartesian system of axes in which the four transmission lines are on an XY plane, such that this orientation on the Z-axis is opposite to the orientation of the coaxial input of the former unit cell on the same Z-axis, the distance between coaxial inputs is set to λ/4, wherein λ is the wavelength of an operating frequency of the microwave distribution network, and the adjacent layers are interconnected by means of the coaxial inputs of the unit cells that are arranged in opposite directions.

The invention also provides an antenna array, a reflector antenna or a lens antenna comprising such microwave distribution network.

The above configuration of the microwave distribution network provides an effective overlapping of the radiation areas.

Another advantage of the invention is that the microwave distribution network can be totally passive and reciprocal, and it could be used in transmission and reception simultaneously, and can also be part of an active system or include active elements, either in reception or transmission or both.

Other features and advantages of the present invention will become apparent from the following detailed description of an illustrative embodiment and not limiting its purpose in connection with the accompanying figures.

DESCRIPTION OF FIGURES

FIG. 2 shows a hexagonal lattice formed by the three transmission lines of the unit cell depicted in FIG. 1 after periodical replication of the unit cell and FIG. 2A shows a rectangular lattice formed by the four transmission lines of the unit cell depicted in FIG. 1A after periodical replication of the unit cell.

FIG. 5 shows a stacking of layers and FIG. 5A shows the orientation of the coaxial ports of each layer and how the layers of FIG. 5 are interconnected.

DETAILED DESCRIPTION OF THE INVENTION

Figure 1:
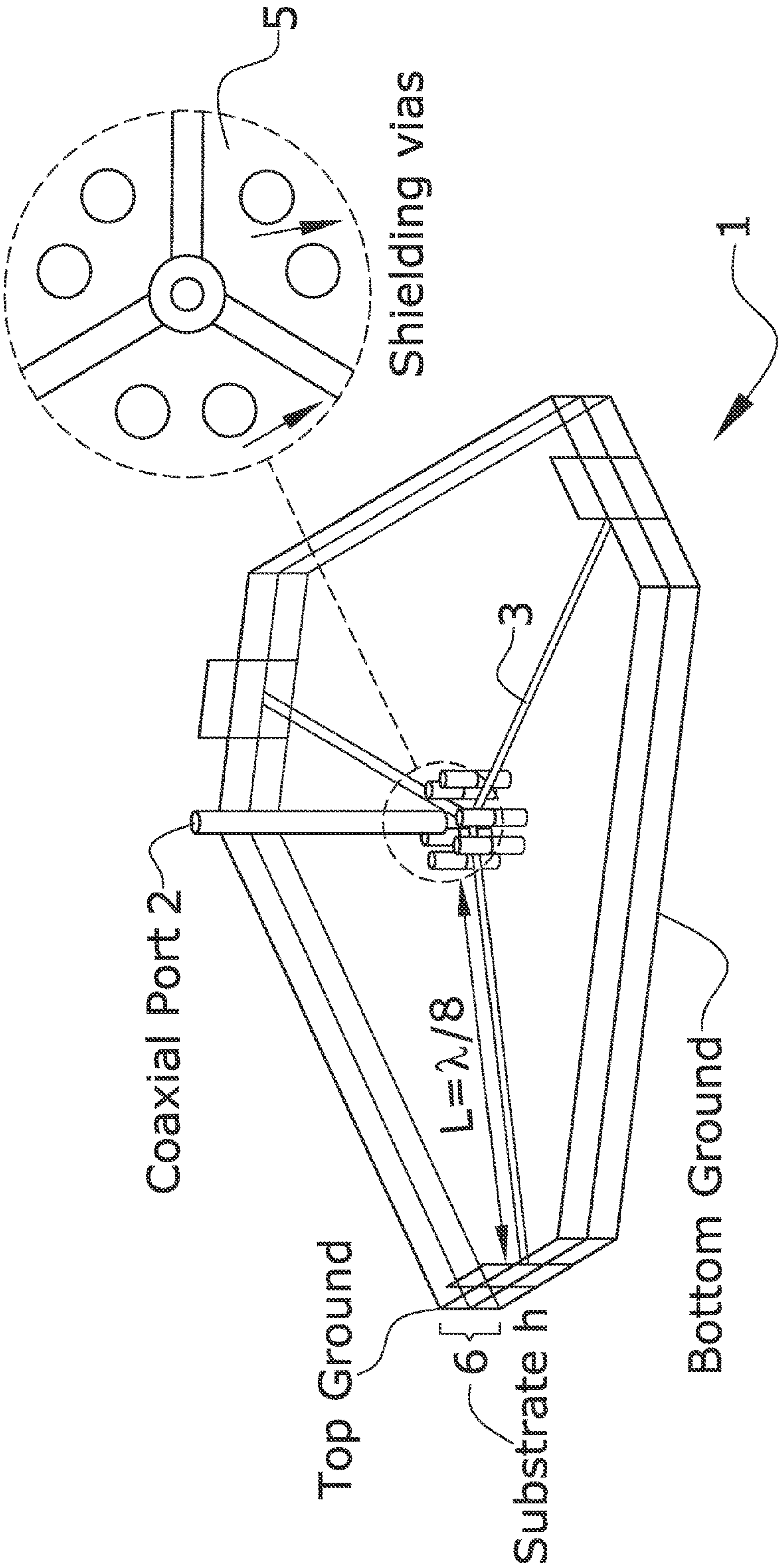
FIG. 1 and FIG. 1A show a unit cell with three transmission lines and four transmission lines, respectively.

A new topology of structure, called Overlapped Distribution Network (ODIN) is proposed. The basic unitary cell of the network is shown in FIG. 1. The proposed structure is a 4-port network, whose dimensions could be tuned in order to guarantee an equal power distribution to each branch. The basic structure consists of a transition from a coaxial port or input to three equal transmission lines placed with an angular span of 120 degrees. The transmission lines can be strip-lines.

Figure 1A:
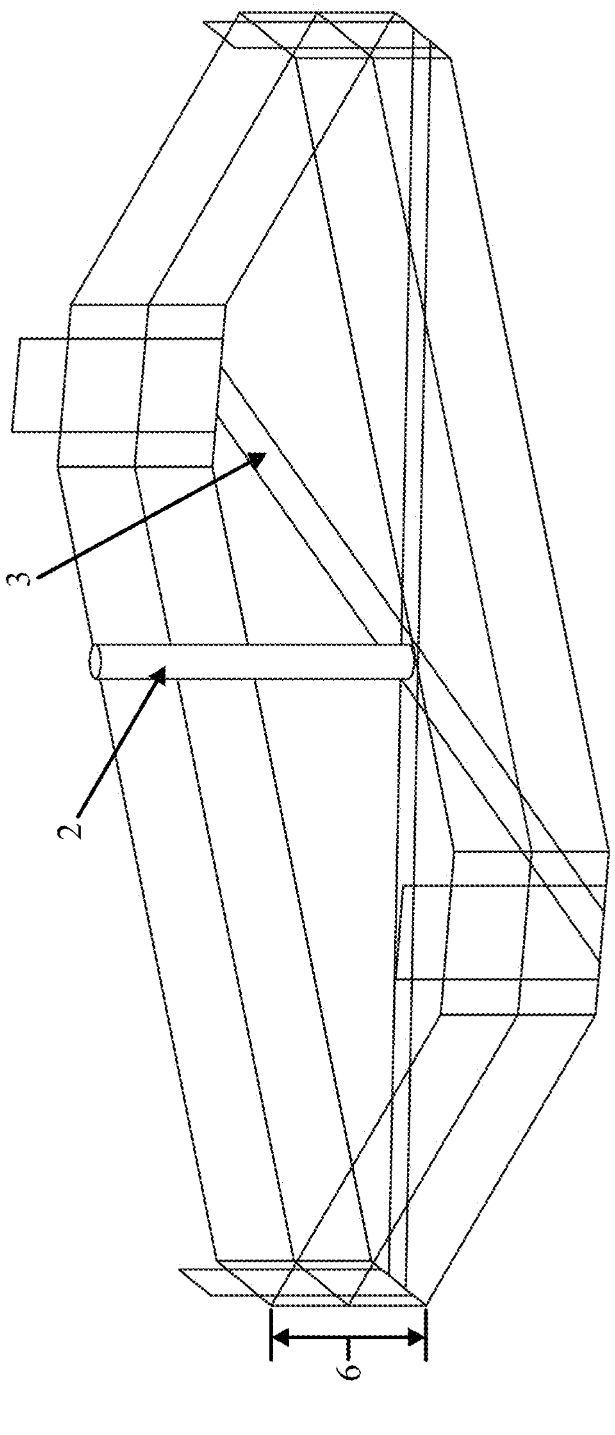

As shown in FIGS. 1 and 1A, the unit cells 1 include a plurality of shielding vias 5 surrounding the transition between the coaxial input 2 and the transmission lines 3, and a substrate 6 in which the transmission lines 3 are placed, and in which the coaxial input 2 enters.

Some vias surrounding the transition can be placed to provide shielding and facilitate the coupling of the fields to the transmission lines.

Let P1 be the coaxial port, $Z_0$ the characteristic impedance of the coaxial line and $Z_s$ the characteristic impedance of the transmission lines. The input impedance observed from P1 is directly obtained by calculating the parallel of the three transmission line impedances. Thus, $$Z_{in\_coax} = Z_S / 3 \quad (1)$$

If perfect matching is desired, relation (2) is obtained straightforwardly.

$$Z_S = 3 \cdot Z_0 \quad (2)$$

Figure 2:
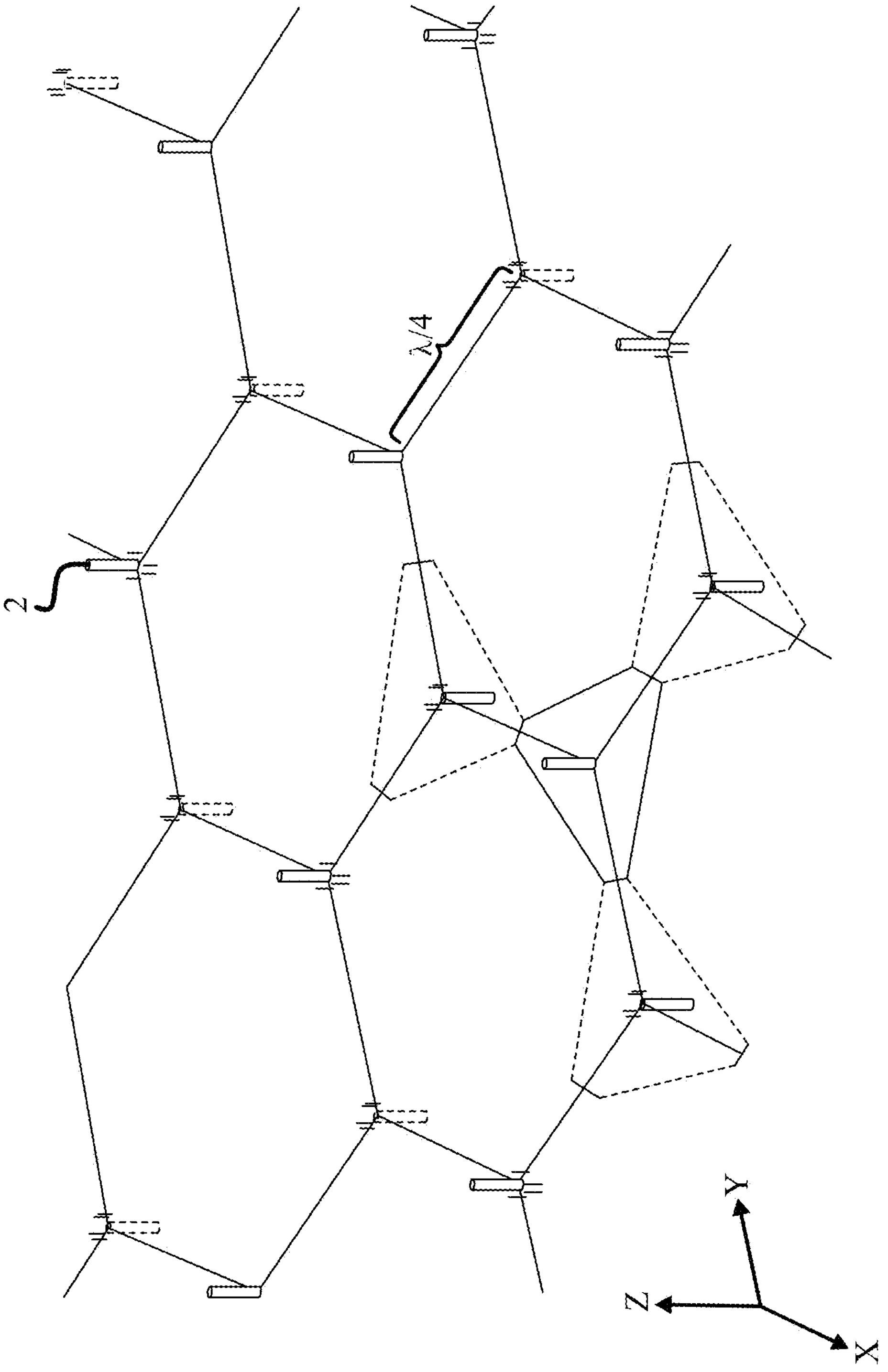
FIG. 2 shows a hexagonal lattice formed after periodical replication of the unit cell and FIG. 2A shows a rectangular lattice formed after periodical replication of the unit cell.
Figure 2A:
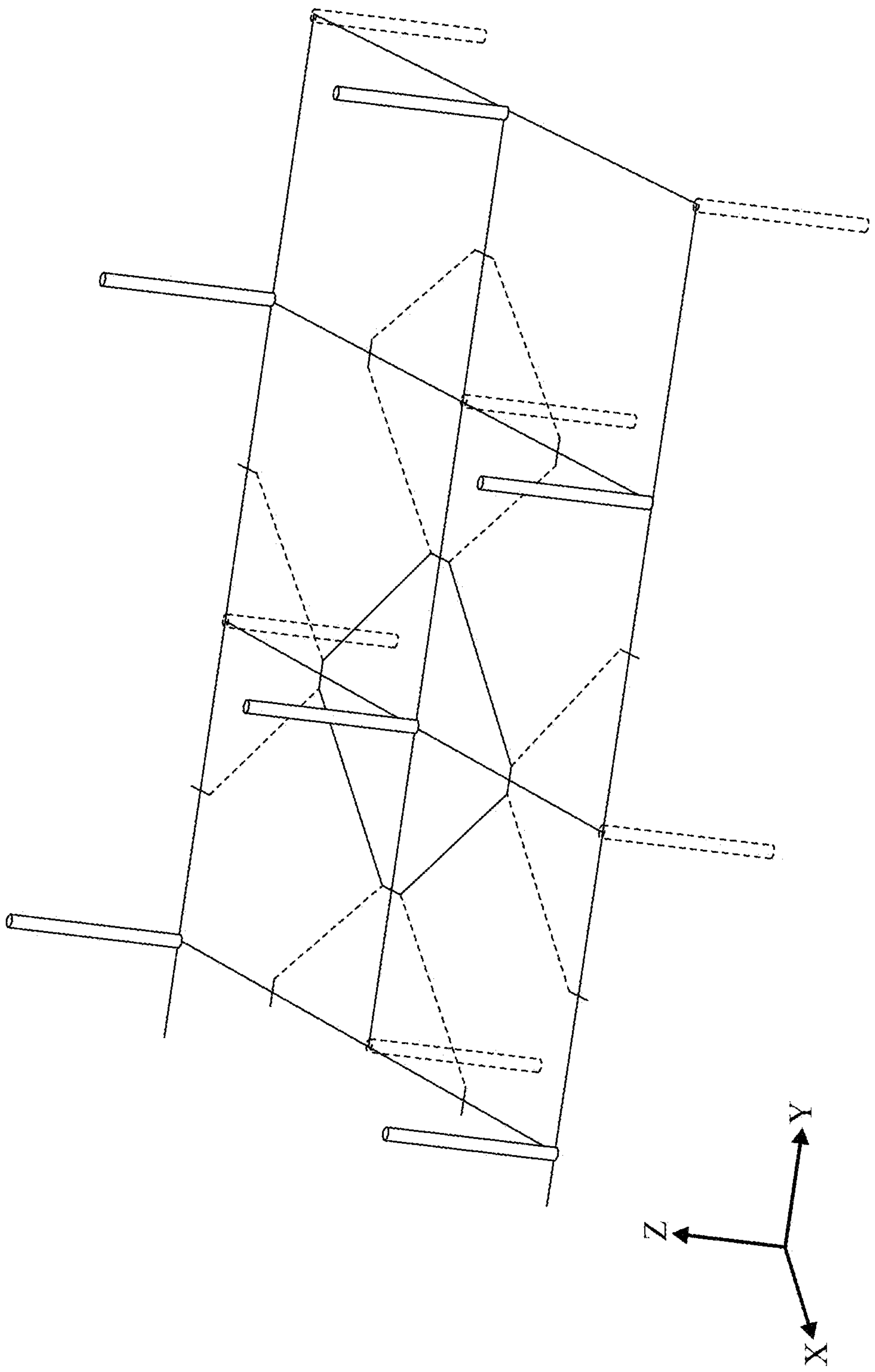

Let us assume now an infinite, periodical replication of the cell, connecting each cell to three neighbours. After this periodical transformation, all the ports of the network will be coaxial lines, working the transmission lines as interconnections between these coaxial ports (FIG. 2).

Figure 3:
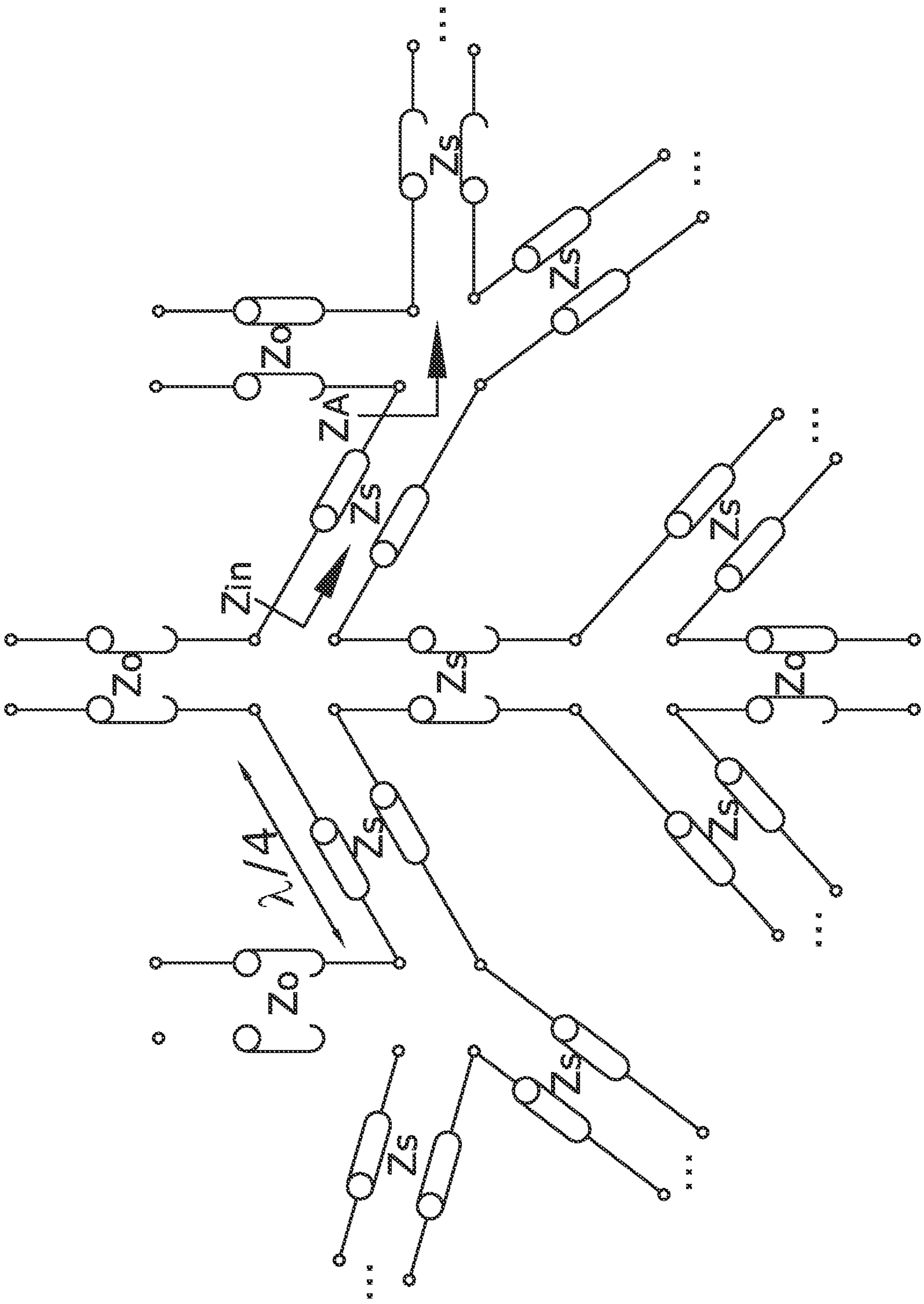
FIG. 3 shows the periodicity condition and impedance point of view.

It is important to note that, within this replication, neighbour coaxial ports will present different orientations on the Z-axis. This means, if the coaxial port in the original cell is pointing upwards, the three nearest neighbours will point downwards. Following this fashion, their neighbours will point upwards, and so on. The distance between these ports will be now such that it satisfies a quarter of the wavelength conditions. The replication of the cell in the aforementioned manner implies the creation of a hexagonal lattice, as depicted in FIG. 2. Given the periodicity condition, since no end of the lattice is considered, it could be asserted that the impedance seen at the input each transmission line branch is the same, namely $Z_{in}$. This impedance will be the result of the mutual influence among every neighbour cell. Each cell will be loaded by the rest of the network. Under the same assumption, the impedance seen at the end of each transmission line, namely $Z_A$ (corresponding to the parallel of the coaxial line and the other two transmission lines, connected to the rest of the network) will also be the same at every intersection. For a clearer perspective from the impedance point of view, refer to FIG. 3. Let $Z_0$ and $Z_s$ be the characteristic impedance of the coaxial line and the transmission line respectively. Since the length of the transmission line corresponds to a quarter of a wavelength, the transmission lines work as quarter-wave impedance transformers, following the well-known relationship:

$$Z_{in} = Z_S^2 / Z_A \quad (3)$$

Where $Z_A$ is calculated as the parallel impedance between one coaxial port and two transmission lines loaded with the rest of the periodical structure.

$$Z_A = Z_0 \,//\, Z_{in} \,//\, Z_{in} \quad (4)$$

$$1/Z_A = 1/Z_0 + 1/Z_{in} + 1/Z_{in}$$

$$Z_A = Z_0 \cdot Z_{in} / (2 \cdot Z_0 + Z_{in}$$

Given that, in order to ensure impedance matching at the coaxial ports, $Z_{in}=3\cdot Z_0$, and substituting (4) in (3), the following relationship between the characteristic impedance of the coaxial lines and the transmission lines is obtained (5).

$$Z_S = Z_0 \cdot sqrt(9/5) \quad (5)$$

Furthermore, it can be also checked that:

$$Z_A = 3/5 \cdot Z_0 \quad (6)$$

Figure 4:
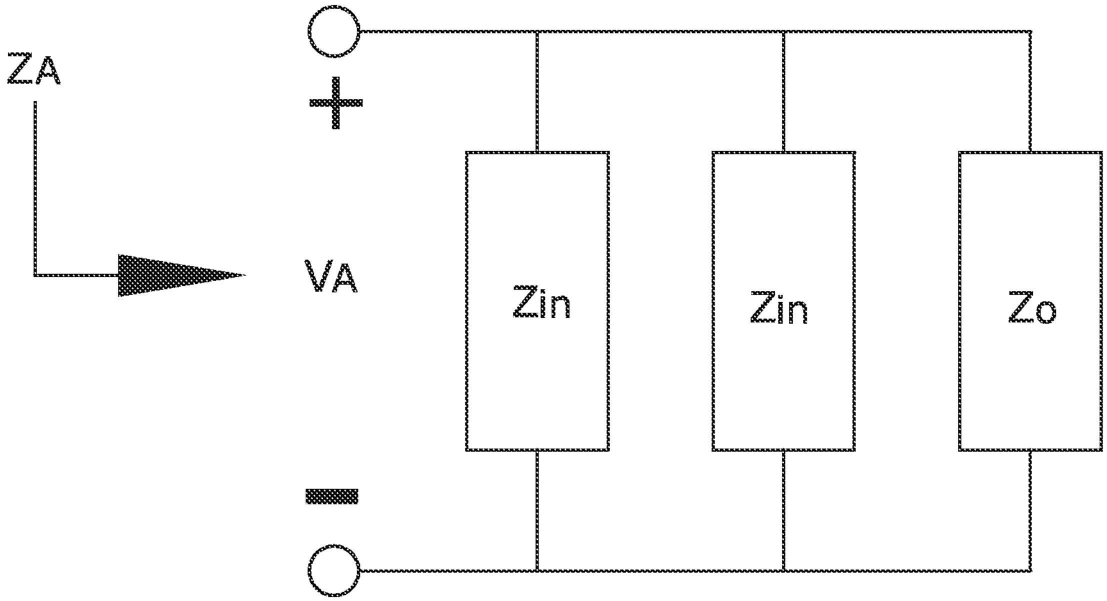
FIG. 4 is a scheme of the current divisor present at the intersection between the coaxial port and the three transmission lines, from the point of view of the transmission line.

At this point, since the input impedance seen at each branch is the same, it can be stated that the total power entering the network from an only coaxial input port is divided equally among the three transmission lines. Following this assumption, the power delivered to the neighbour coaxial ports can be calculated as the power delivered to a $Z_0$ Ω load in a current divisor with three parallel impedances: $Z_0//Z_{in}//Z_{in}$ from the point of view of $Z_A$. For a clearer idea, refer back to FIG. 2, as well as to FIG. 4. Here, an auxiliary voltage $V_A$ could be defined from the relation between power and voltage (7a). Subsequently, it can be obtained that the power delivered to the load $Z_0$ corresponds to 3/5 of the power available at the input transmission line. Therefore, it is concluded that the power delivered to each coaxial port, neighbour to the input coaxial, will be:

$$P = V \cdot I = V^2 / Z \quad (7a)$$

$$P_{Z0} = V_A^2 / Z_0 = P_A \cdot Z_A / Z_0 = 1/3 P_T \cdot 3/5 = 1/5 P_T \quad (7b)$$

Where $P_T$ stands for the total input power coming from the first coaxial port. Until now, it has determined: the amount of power delivered to each branch from the coaxial port (one third each) and the amount of power delivered to each neighbour port (three-fifths of the available power at each branch, namely one-fifth of the total power). From these results, it can be deduced that six-fifteenths of the total power (one per transmission line branch) are being delivered to the rest of the network. As stated in (7b), three-fifths of the power will be delivered to the coaxial port (1/25 of the total power, namely −14 dB), which will be the nominal isolation between in-plane consecutive coaxial ports (this means, consecutive coaxial ports with the same orientation in the Z-axis).

Up to this point, the main features and behaviour of the network have been presented and its properties under a periodicity condition have been discussed. The next step involves the stacking of several layers 4 of the hexagonal lattice, as sketched in FIG. 5. With this regard, it is important to note that it was stated that the coaxial ports are arranged with alternately directions. This feature will allow the interconnection of the layers 4 and the longitudinal propagation of the energy across the structure, as shown in FIG. 5A.

Figure 5:
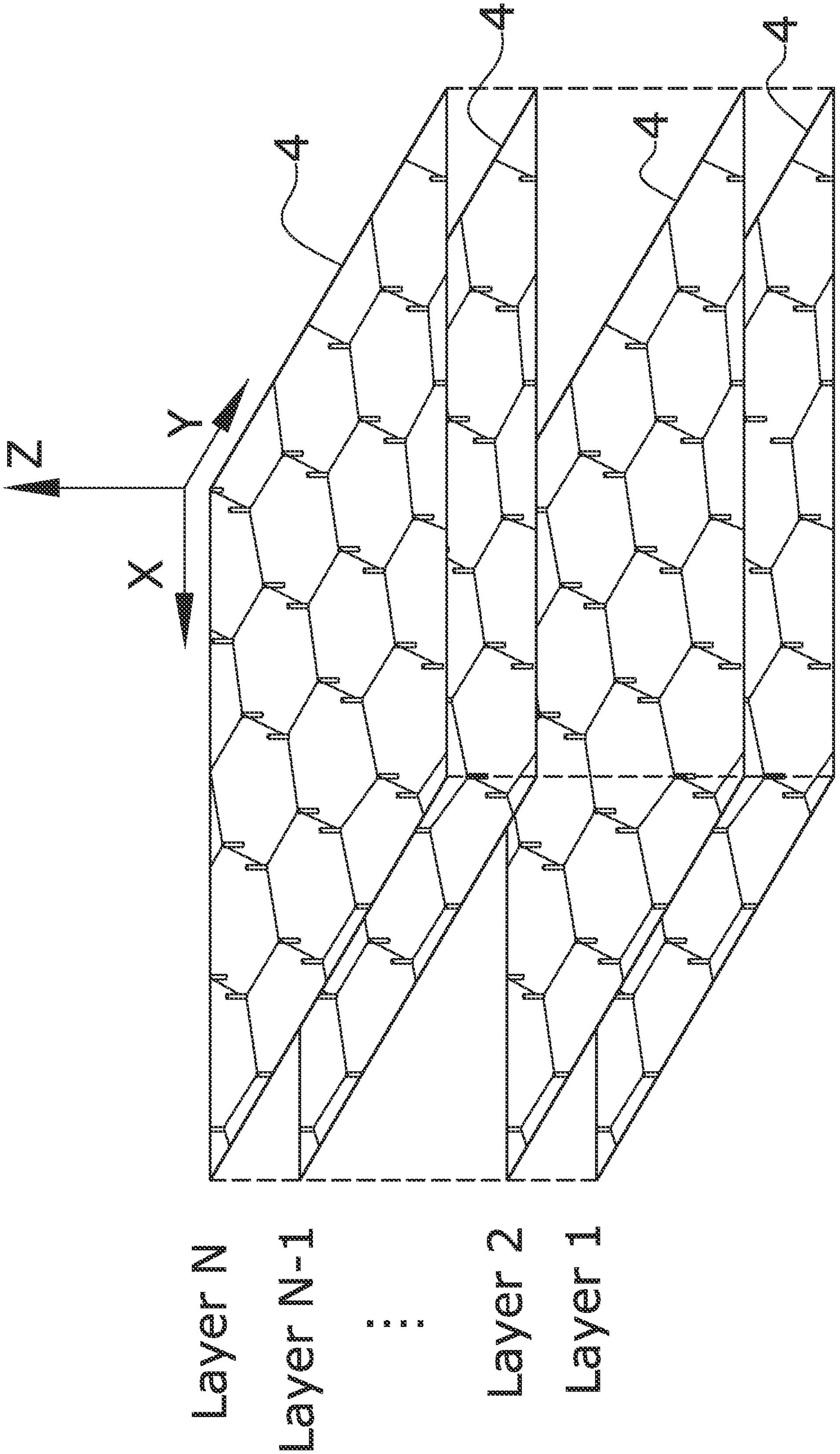

As shown in FIG. 5A, the coaxial inputs 2 of the layers depicted in FIG. 5 are stacked and aligned vertically to allow for the longitudinal propagation of energy through the layers between the inputs I1, I2, I3, I4, . . . IN and the outputs O1, O2, O3, O4, . . . ON.

Figure 8A:
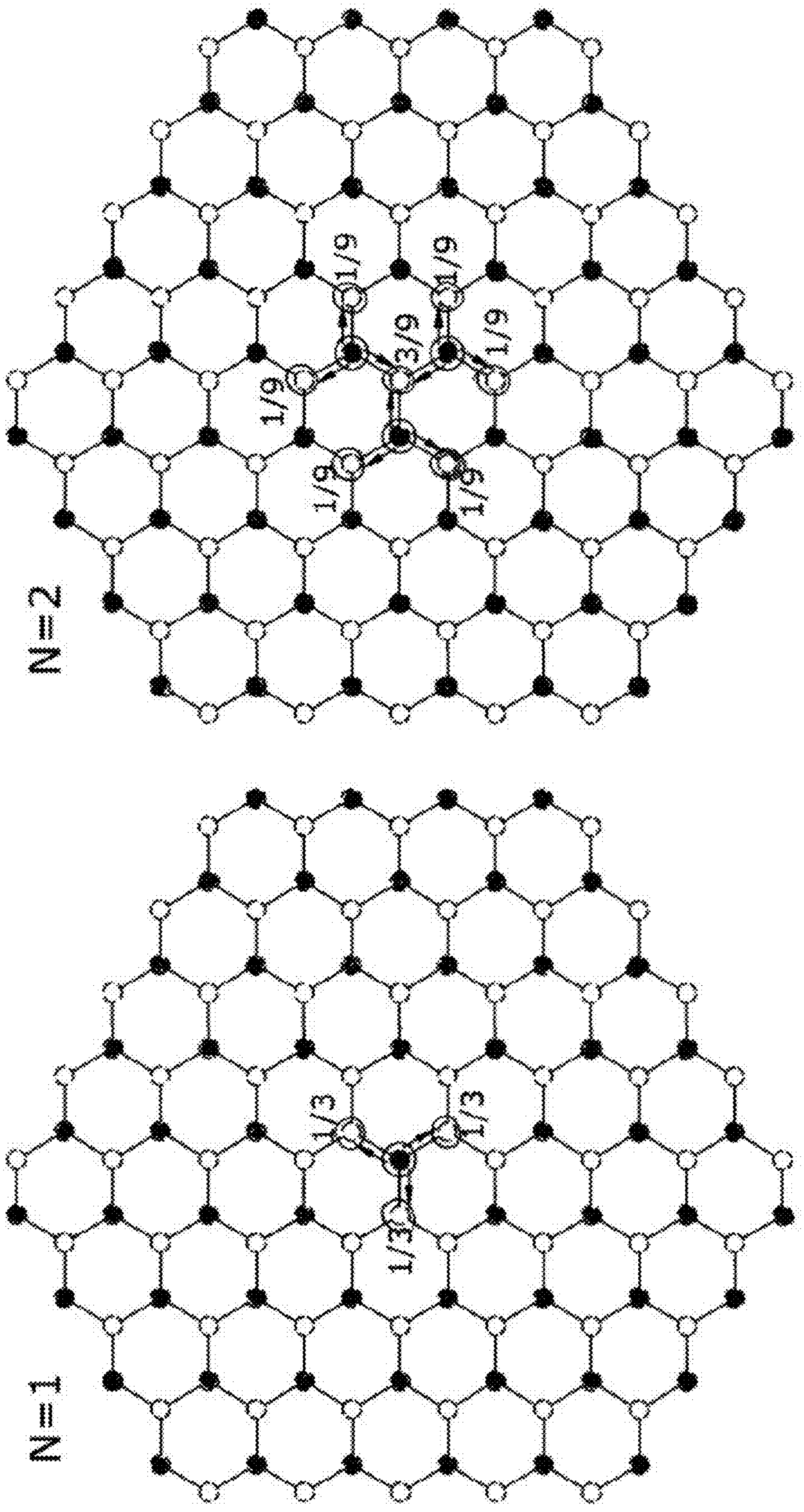
FIGS. 8A, 8B and 9 show an example of power distribution on a 4-layer ODIN with a periodic layer for the ideal case.
Figure 8B:
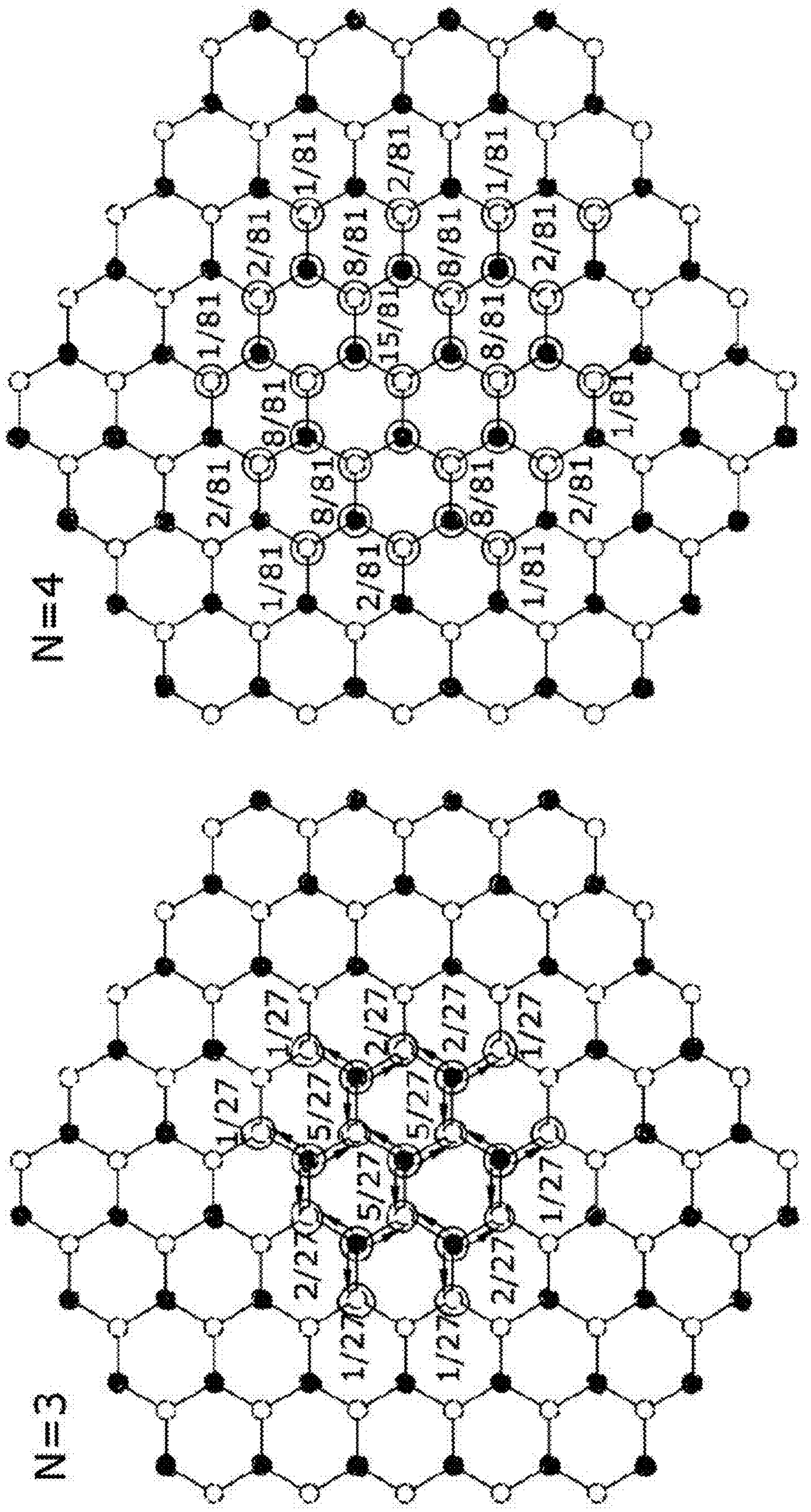
Figure 9:
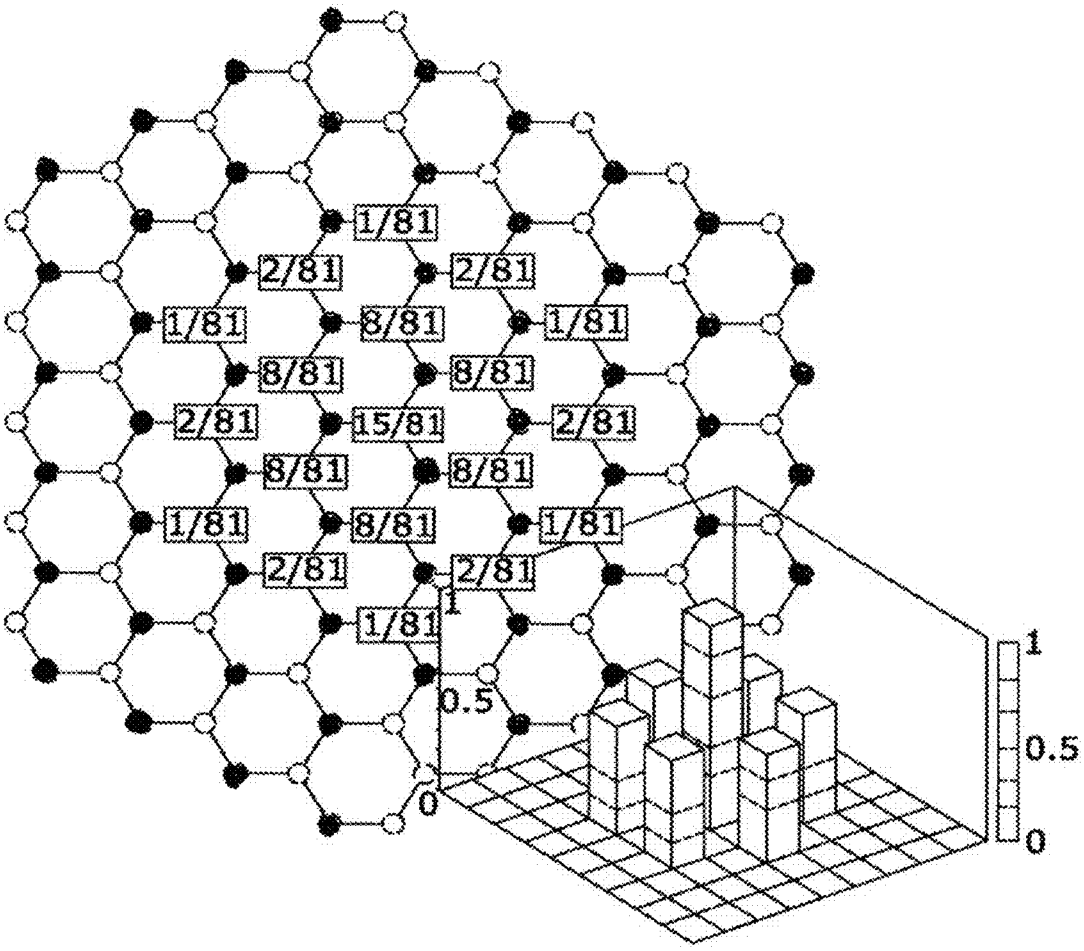

Reference is made to FIGS. 8 and 9 to see an example representation of the power distribution of an N=4 scenario (this means, one third of the power is delivered to each neighbour port). Here, dark circles represent the power inputs at each layer, while light circles represent the output ports at each layer. Smaller light circles represent coaxial lines pointing downwards and smaller dark circles correspond to the ones pointing upwards at N=1. For N=2, 3 . . . their orientation shall be exchanged alternatively at each layer, in order to follow an upward propagation. The power is distributed within each layer, concentrating its most part at the central position with respect to the input port at Layer 1. As it can be seen, since the side of the hexagon corresponds to a quarter of a wavelength, the distance between consecutive radiating elements is lower than half a wavelength.

Figure 6:
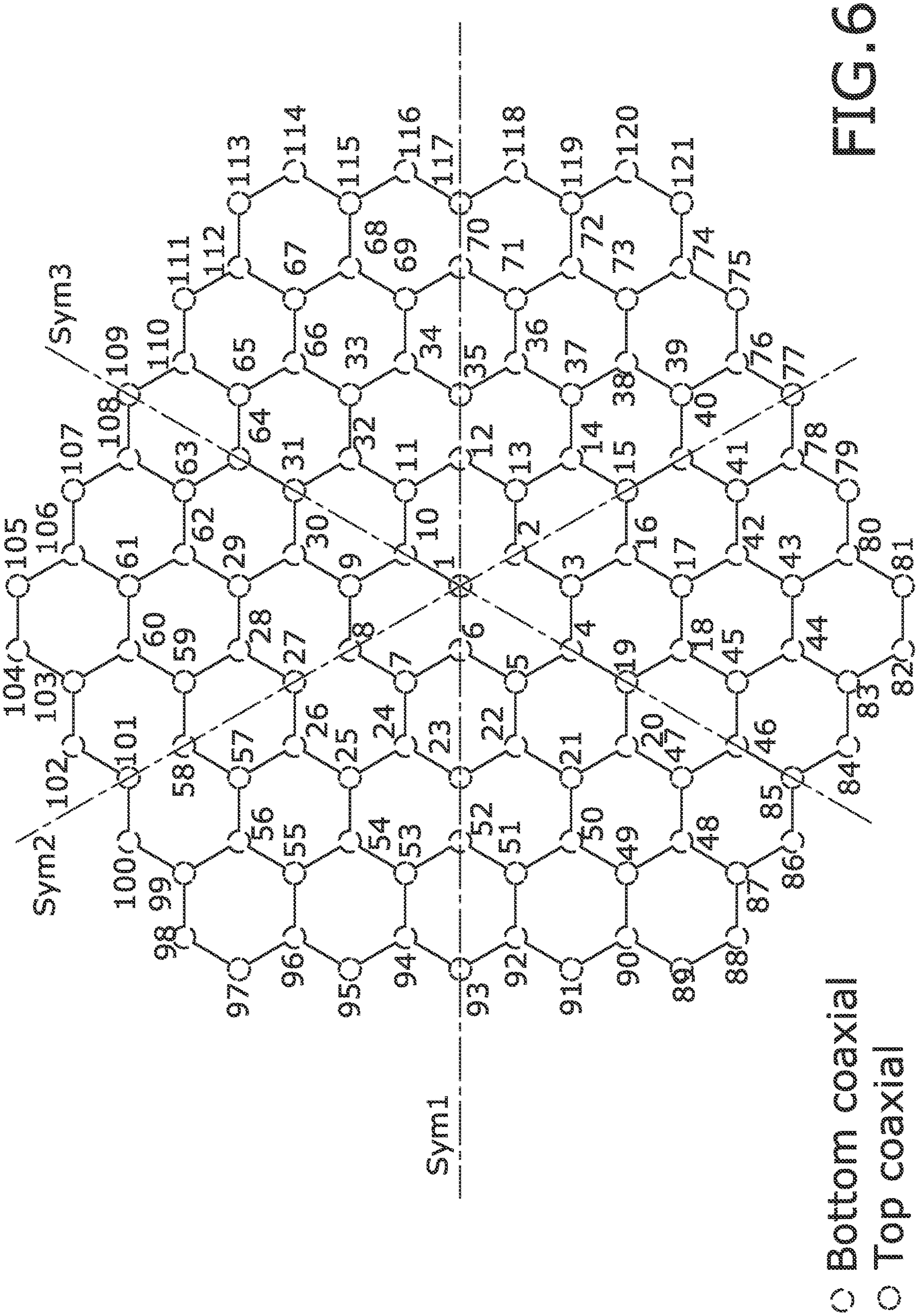
FIG. 6 is a diagram of a simulated structure with 121 coaxial inputs.
Figure 7:
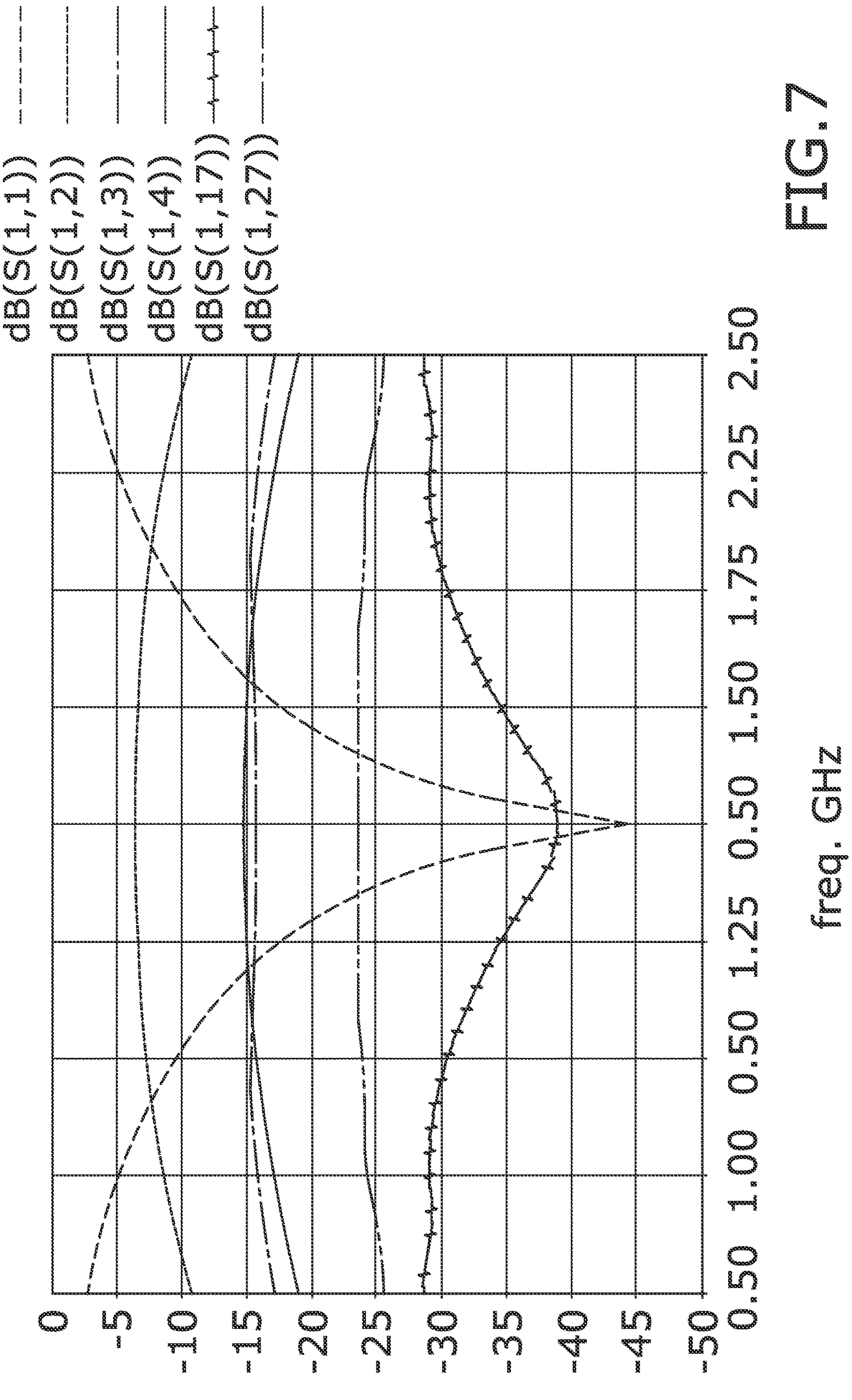
FIG. 7 shows input port's reflection, transmission and isolation between input and output ports.

In order to provide an example of the performance of the network, as single, finite layer of the structure, as depicted in FIG. 6 was simulated in a circuital simulator software. The coaxial ports were modelled by lumped ports with $Z_0$=50 Ω. The L-Band was chosen as the band of operation and a reference frequency $f_0$ of 1.5 GHz was chosen to design the quarter wave transformers. The fact that the topology is composed of resonant elements infers the resonant behaviour of the network. Since simulating an infinitely periodical structure was unfeasible, a reasonably large structure with 121 ports was simulated. It was observed that the transmission to a neighbour port (for example, from Port 1 to Ports 2, 6 and 10 in FIG. 6) was around −6.5 dB and the isolation between consecutive ports to roughly −16 dB. Regarding non-consecutive ports, we can distinguish between two types of non-consecutive ports: the ones located at the centred normal-axes of the three symmetry axis (ports 17, 21, 25, 29, 33 and 37), and the ones which are not (15, 19, 23, 27, 31 and 35)—See FIG. 6 for a clearer view. It has been seen that the isolation between port 1 and ports of the first type present a higher isolation (below 35 dB) than the rest (below 20 dB). All these parameters are represented in FIG. 7.

In FIG. 8 it can be seen that the signal that enters through one of the inputs, placed in one of the six corners of a hexagon, will distribute the power mainly through the three nearest coaxial outputs to the upper layer, and these in turn will do the same to the next, so that the signal is distributed over an increasingly wide area. The signal is radiated by all the radiating elements that receive a significant part of the introduced signal.

FIGS. 8 and 9 show an example of power distribution on a 4-layer ODIN with a periodic layer for the ideal case. Dark circles represent the sources on each layer. Light circles with a number represent the receiving nodes (output ports) on each layer. In this scenario of four layers, the power division given by the network could be used to feed an hexagonal array of 19 radiating elements.

Several layers of the structure could be appropriately stacked in order to increment the number of radiating elements, thus defining a bigger radiating area for each one of the beams, which could be highly overlapped while sufficiently isolated from each other.

The transmission lines 3 may include stubs or width of lines or height of transmission lines or path lines. The transmission coaxial inputs 2 may include tuning structures or screws or stubs.

Another possibility is to obtain a square or rectangular lattice after the periodical replication of unit cells 1 that comprise a coaxial input 2 connected to four transmission lines 3 with an angular span of 90°, as shown in FIG. 1A, the coaxial input 2 being orientated on an Z-axis of a Cartesian system of axes in which the four transmission lines 3 are on an XY plane. As shown in FIG. 1A, the unit cell 1 that comprises a coaxial input 2 connected to four transmission lines 3 with an angular span of 90° is octagonal.

Although the present invention has been fully described in connection with preferred embodiments, it is apparent that modifications can be made within the scope, not considering this as limited by these embodiments, but by the content of the following claims.

The invention claimed is:

1. A microwave distribution network, comprising a stacking of a plurality of layers, each of the layers comprising a plurality of unit cells, wherein:

each of the plurality of unit cells having a hexagonal shape and comprising a coaxial input connected to three transmission lines with an angular span of 120°, the coaxial input being orientated on a Z-axis of a Cartesian system of axes in which the three transmission lines are on an XY plane, the plurality of layers are configured as a hexagonal lattice formed with the three transmission lines of the unit cells by periodical replication, with the unit cells positioned with the coaxial inputs placed at corners of the hexagons, such that each unit cell of the plurality of unit cells is connected to three neighbour unit cells of the plurality of unit cells, the coaxial inputs of the three neighbour unit cells being oriented on the Z-axis of a Cartesian system of axes in which the three transmission lines of each of the three neighbour unit cells are on the XY plane, such that an orientation of the coaxial input on the Z-axis is the same as an orientation of the coaxial input of a unit cell on the same Z-axis in a different layer, a distance between adjacent coaxial inputs of the same layer is λ/4, wherein λ is the wavelength of an operating frequency of the microwave distribution network, an orientation the coaxial input of the same layer on the Z-axis is opposite an orientation on the Z-axis of an adjacent coaxial input of the same layer, and adjacent layers are interconnected by the coaxial inputs of the unit cells in the adjacent layers that are arranged in the same directions.

2. The microwave distribution network, comprising a stacking of a plurality of layers, each of the layers comprising a plurality of unit cells, wherein:

each of the plurality of unit cells having eight sides and comprising a coaxial input connected to four transmission lines with an angular span of 90°, the coaxial input being orientated on a Z-axis of a Cartesian system of axes in which the four transmission lines are on an XY plane, the plurality of layers are configured as a square or rectangular lattice formed with the four transmission lines of the unit cells by periodical replication, with the unit cells positioned with the coaxial inputs placed at corners of the square or rectangle, such that each unit cell of the plurality of unit cells is connected to four neighbour unit cells of the plurality of unit cells, the coaxial inputs of the four neighbour unit cells being oriented on the Z-axis of a Cartesian system of axes in which the four transmission lines of each of the four neighbour unit cells are on the XY plane, such that an orientation of the coaxial input on the Z-axis is the same as an orientation of the coaxial input of a unit cell on the same Z-axis in a different layer, a distance between adjacent coaxial inputs of the same layer is λ/4, wherein λ is the wavelength of an operating frequency of the microwave distribution network, an orientation the coaxial input of the same layer on the Z-axis is opposite an orientation on the Z-axis of an adjacent coaxial input of the same layer, and adjacent layers are interconnected by the coaxial inputs of the unit cells in the adjacent layers that are arranged in the same directions.

3. The microwave distribution network according to claim 1, wherein each of the plurality of unit cells comprise a plurality of shielding vias surrounding the transition between the coaxial input and the transmission lines.

4. The microwave distribution network according to claim 1, wherein each unit cell of the plurality of unit cells comprises a substrate in which the transmission lines are placed and in which the coaxial input enters.

5. An antenna array comprising the microwave distribution network of claim 1.

6. A reflector antenna system comprising the microwave distribution network of claim 1.

7. A lens antenna comprising the microwave distribution network of claim 1.

* * * * *